UNITED STATES PATENT OFFICE.

CHARLES M. HIGGINS, OF BROOKLYN, NEW YORK.

MUCILAGE AND ADHESIVE COMPOUND.

SPECIFICATION forming part of Letters Patent No. 466,238, dated December 29, 1891.

Application filed May 18, 1891. Serial No. 393,195. (No specimens.)

*To all whom it may concern:*

Be it known that I, CHARLES M. HIGGINS, a citizen of the United States, residing in Brooklyn, in the county of Kings and State of New York, have invented certain new and useful Improvements in Mucilages and Adhesive Compounds, of which the following is a specification.

My improved adhesive compound is formed of water, dextrine, and peroxide of hydrogen, as hereinafter fully set forth.

In forming the compound I first dissolve the dextrine in the water, either hot or cold, preferably in hot or boiling water, and when the solution is made to the desired density the same is allowed to cool to a temperature of from 60° to 100° Fahrenheit, and the peroxide of hydrogen is then added and gently stirred in, and the mucilage is then allowed to stand for several days or weeks until all or nearly all precipitable matter has settled, when it will become ready for bottling or use. The effect of the peroxide of hydrogen on the dextrine solution is to render it much clearer and lighter and to retain a much larger portion of the dextrine in solution than can be retained by a solution in water alone. It is well known that where a solution of dextrine is made in water alone only a portion of the dextrine will be held in permanent solution, for after the solution cools or is allowed to rest for some time a large portion of the dextrine separates or deposits in a dense grayish sediment. I have discovered that when peroxide of hydrogen is added to the solution a much greater quantity of this dextrine is held in solution and only a comparatively small part is deposited, and, in addition to this, the solution which is thus made more dense and permanent is also of a much lighter color and clearer or more transparent in appearance, which are important advantages. If borax or boracic acid is added to the dextrine in making the solution, the action of the peroxide is much more effective, and almost all the dextrine is held in a permanent transparent solution; but this addition is covered by a separate application executed on the same date with this.

My present application is confined to the compound of dextrine and water and peroxide of hydrogen, which I find makes a solution much superior to that made by water and dextrine alone, as already specified, although not equal to that made with the addition of a boron compound.

The proportions I usually prefer are, say, seven to nine pounds of dextrine to the gallon of water, and to this solution is added one-eighth to one-sixteenth of its volume of peroxide of hydrogen. The peroxide that I use is the commercial, of the strength known as "fifteen volumes." These proportions may of course vary according to the density and other qualities of the mucilage required, as will be readily understood.

In this compound the yellow dextrines act better than the white dextrines; but either may be used, the former being much preferable.

What I claim as my invention is—

An adhesive compound formed of water, dextrine, and peroxide of hydrogen, substantially as set forth.

CHAS. M. HIGGINS.

Witnesses:
 JNO. E. GAVIN,
 P. FRANCIS KELLY.